US009134991B2

(12) United States Patent
Arcese et al.

(10) Patent No.: US 9,134,991 B2
(45) Date of Patent: Sep. 15, 2015

(54) AUTOMATIC UPGRADE OF VIRTUAL APPLIANCES

(75) Inventors: Mauro Arcese, Rome (IT); Giuseppe Ciano, Rome (IT); Alessandro Donatelli, Rome (IT); Luigi Pichetti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 932 days.

(21) Appl. No.: 13/215,288

(22) Filed: Aug. 23, 2011

(65) Prior Publication Data
US 2012/0054736 A1 Mar. 1, 2012

(30) Foreign Application Priority Data

Aug. 27, 2010 (EP) ................................ 10174377

(51) Int. Cl.
G06F 9/445 (2006.01)
(52) U.S. Cl.
CPC ........................................ G06F 8/65 (2013.01)
(58) Field of Classification Search
None
See application file for complete search history.

(56) References Cited

U.S. PATENT DOCUMENTS

| 6,356,915 | B1 * | 3/2002 | Chtchetkine et al. | 707/823 |
| 6,405,362 | B1 * | 6/2002 | Shih et al. | 717/174 |
| 6,529,992 | B1 * | 3/2003 | Thomas et al. | 711/1 |
| 6,973,647 | B2 | 12/2005 | Crudele et al. | |
| 8,365,164 | B1 * | 1/2013 | Morgenstern | 717/175 |
| 2002/0188938 | A1 * | 12/2002 | Dong et al. | 717/174 |
| 2003/0056207 | A1 * | 3/2003 | Fischer et al. | 717/174 |
| 2005/0278461 | A1 * | 12/2005 | Ohta | 710/8 |
| 2006/0195832 | A1 * | 8/2006 | Chandley et al. | 717/168 |
| 2007/0233842 | A1 * | 10/2007 | Roberts et al. | 709/223 |
| 2008/0215796 | A1 * | 9/2008 | Lam et al. | 711/100 |
| 2009/0216975 | A1 * | 8/2009 | Halperin et al. | 711/162 |
| 2009/0222805 | A1 * | 9/2009 | Faus et al. | 717/168 |
| 2009/0292737 | A1 * | 11/2009 | Hayton | 707/200 |
| 2009/0300149 | A1 * | 12/2009 | Ferris et al. | 709/222 |

(Continued)

FOREIGN PATENT DOCUMENTS

WO 2008117500 A1 10/2008

OTHER PUBLICATIONS

VMWare, "VMware Disk Mount Users Guide", 2008, retrieved from: http://web.archive.org/web/20090206060709/http://vmware.com/pdf/VMwareDiskMount.pdf.*

(Continued)

*Primary Examiner* — Jue Louie
(74) *Attorney, Agent, or Firm* — Thomas E. Lees, LLC

(57) ABSTRACT

A software application distributed as a virtual appliance is automatically installed, updated and removed in a virtual machine system running on top of a virtual machine monitor in a computer. The software application virtual appliance comprises a virtual disk, which is automatically detected and installed or removed at the customer by a virtual disk activation manager program, which executes scripts including commands through an API to the virtual machine monitor. The virtual appliance virtual disk is also created automatically by the software manufacturing using the virtual disk activation manager program. The virtual appliance virtual disk stores the binaries of the software application, a software package created by the software manufacturer using a software package tool, an installer to execute the software package, installation and un-installation scripts and a unique identifier which is a signature for the virtual machine virtual disk.

10 Claims, 5 Drawing Sheets

(56) References Cited

U.S. PATENT DOCUMENTS

| | | | |
|---|---|---|---|
| 2009/0300641 A1 | 12/2009 | Friedman et al. | |
| 2010/0011358 A1* | 1/2010 | Kettler et al. | 718/1 |
| 2010/0031255 A1 | 2/2010 | Huber | |
| 2010/0088699 A1* | 4/2010 | Sasaki | 718/1 |
| 2010/0228913 A1* | 9/2010 | Czezatke et al. | 711/112 |
| 2010/0235482 A1* | 9/2010 | Chalupa et al. | 709/222 |
| 2011/0185292 A1* | 7/2011 | Chawla et al. | 715/760 |

OTHER PUBLICATIONS

Sun et al. "Simplifying Service Deployment with Virtual Appliances", 2008, 2008 IEEE International Conference on Services Computing.*

Constantine Sapuntzakis et al., "Virtual Appliances for Deploying and Maintaining Software", Proceedings of the 17th USENIX conference on System Administration, USENIX Association, 2003.

Notification Concerning Transmittal of International Preliminary Report on Patentability for PCT Application No. PCT/EP2011/064188; Mailing Date of Mar. 14, 2013; The International Bureau of WIPO, Geneva, Switzerland.

Notification of Transmittal of the International Search Report and the Written Opinion of the International Searching Authority for PCT Application No. PCT/EP2011/064188; Mailing Date of Feb. 2, 2012; European Patent Office; Rijswijk, Netherlands.

Louie, Jue Wang, Office Action dated Jul. 2, 2014, for U.S. Appl. No. 13/462,897, filed May 3, 2012, entitled "Automatic Upgrade of Virtual Appliances", United States Patent and Trademark Office.

Louie, Jue Wang; Final Office Action dated Jan. 16, 2015, for U.S. Appl. No. 13/462,897, filed May 3, 2012, entitled "Automatic Upgrade of Virtual Appliances", United States Patent and Trademark Office.

Dawson Dean and Matt LaMantia; "The VIX API", VMWorld, 2006.

VMWare VIX API Reference Guide; "Getting Started", retrieved from http://www.vmware.com/products/beta/vmware_server/vix_api/ReferenceGuide/, Copyright 2006-2009.

Taiwan Patent Office; Notification dated Mar. 3, 2015 for Taiwan Patent Application No. 100128051; see in particular p. 6 for cited references.

* cited by examiner

AUTOMATIC UPGRADE OF VIRTUAL APPLIANCES

CROSS-REFERENCE TO RELATED APPLICATIONS

This application claims priority to European Patent Application No. 10174377.1, filed Aug. 27, 2010, the disclosure of which is incorporated herein by reference.

BACKGROUND

Aspects of the present invention relate generally to the installation and upgrade of software distributed as virtual appliances, and more particularly, to the automatic activation of virtual disks containing virtual appliances.

The utilization of a virtual appliance represents a new way of deploying software applications. Virtual appliances are virtual machine images comprising at least one software application and at least one virtual machine (VM). A virtual appliance can be directly installed on a virtual machine monitor operating on a physical machine.

From a software packaging and distribution point of view, software developers can create a single platform, reducing the cost and complexity of software development and management. Virtual appliances are provided to the user or customer as files, via either electronic downloads or physical distribution. By distributing virtual appliances, the software application manufacturers deliver a turnkey software service to the end user.

However, a single virtual machine is not sufficient to create a virtual appliance for distributing a multi-tier architecture application such as a client server application comprising as many tiers as separate processes. Rather, a virtual appliance of a multi-tier architecture includes at least as many virtual machines as the number of tiers. For instance, compared to current virtual appliances that contain a single virtual machine only, modern enterprise applications modeled as service oriented architectures (SOA) implement a multi-tier architecture where each tier contains one or more machines. Accordingly, a single virtual machine model is not sufficient to distribute a multi-tier service. Rather, the virtual appliance will be composed of multiple virtual machines. For a Web application that consists of three tiers, one tier implementing the presentation logic, an application server tier implementing the business logic and a back-end database tier, the virtual appliance will include three virtual machines, one for each tier.

Today the components of a virtual appliance can be separated into virtual disks. A virtual disk image is a file on a physical disk which has a format that can be interpreted by a virtual machine monitor as a hard disk. In most cases it is possible to separate the base operating system of the virtual machine from the other software applications and other components creating multiple virtual disks forming the virtual appliance. Almost all the applications distributed for UNIX comprise a binary section containing all the binaries to run the application that do not depend on the specific system where they are installed. A configuration/data section is also provided, which contains configuration and data files specific to the current installation. The two sections can be installed on two different file system paths potentially pointing to two different virtual disks.

There are many interests in delivering a virtual appliance on multiple disks. For instance, delivering a virtual appliance on multiple disks simplifies maintenance of the software application product binaries. As an example, the software application manufacturer can update the binaries and provide a new virtual disk with updated binaries to the customer. The customer can stop the virtual machine, replace the corresponding virtual disk image and restart the virtual machine. The customer can also modify the operating system virtual disk of the virtual appliance and replace the operating system with a different version.

In order to support different virtual environments such as VMware (VMware is a registered trademark of VMware, Inc.) or Xen (Xen is a trademark of Citrix Systems, Inc.) the application software manufacturer converts, for instance, the VMware formatted virtual disk for the product application binaries (product disk) into a Xen formatted virtual disk. However, the virtual disk containing the operating system has no need to be converted. The product disk can be used to support different virtual machines. By using the Xen "img" virtual disk format, the user can mount a virtual disk containing the product application binaries in a Linux system (Linux is a registered trademark of Linus Torvalds) into the appropriate mount point and configure the virtual disk using software application activation scripts. This is equivalent to installing the product in a Linux Server. In this context, the same product disk can be installed on the same operating system family. For each version of the same operating system, the scripts can be different. Consequently, all the scripts provided with the product disk apply to the same operating system family. Moreover, the product itself can be divided into multiple disks for separating the product binaries from the configuration/data. In this case, it will be possible to update the binaries without losing any configuration and/or data.

However installing or replacing the virtual disk containing the application binaries distributed on virtual disks requires execution of manual operations. For instance, the user has to manually run configuration/installation scripts to install the virtual disk in order to create and/or update system files under the virtual machine system directories.

BRIEF SUMMARY

According to aspects of the present invention, a software application distributed as a virtual appliance in a virtual machine system is automatically upgraded, comprising detecting, by an application programming interface of a virtual machine monitor, a change in a previously stored version of a list of virtual appliance virtual disks attached to a corresponding virtual machine. The automatic upgrade is further implemented by performing, if a new virtual appliance virtual disk is detected, the operations of storing deactivation scripts on the new virtual disk on at least one operating system virtual disk and executing an installation script on the new virtual disk. Execution of the installation script is performed by modifying the operating system according to instructions stored on the new virtual disk by starting execution of an installing/un-installing program stored on the new virtual disk which installs the software application stored on the new virtual disk and by adding an entry for the new virtual appliance virtual disk in the list of the virtual disks currently attached. Aspects of the invention, described more fully herein, may be implemented, for instance, as a method for automatically upgrading a software application distributed as a virtual appliance, in a virtual machine system comprising at least one OS virtual disk, running on top of a virtual machine monitor in a computer. Alternatively, aspects set out more fully herein may be implemented as a computer usable storage memory with executable program code, the program code instructing a processor to perform the approach set out above aspects of the invention.

DETAILED DESCRIPTION

Figure 1:
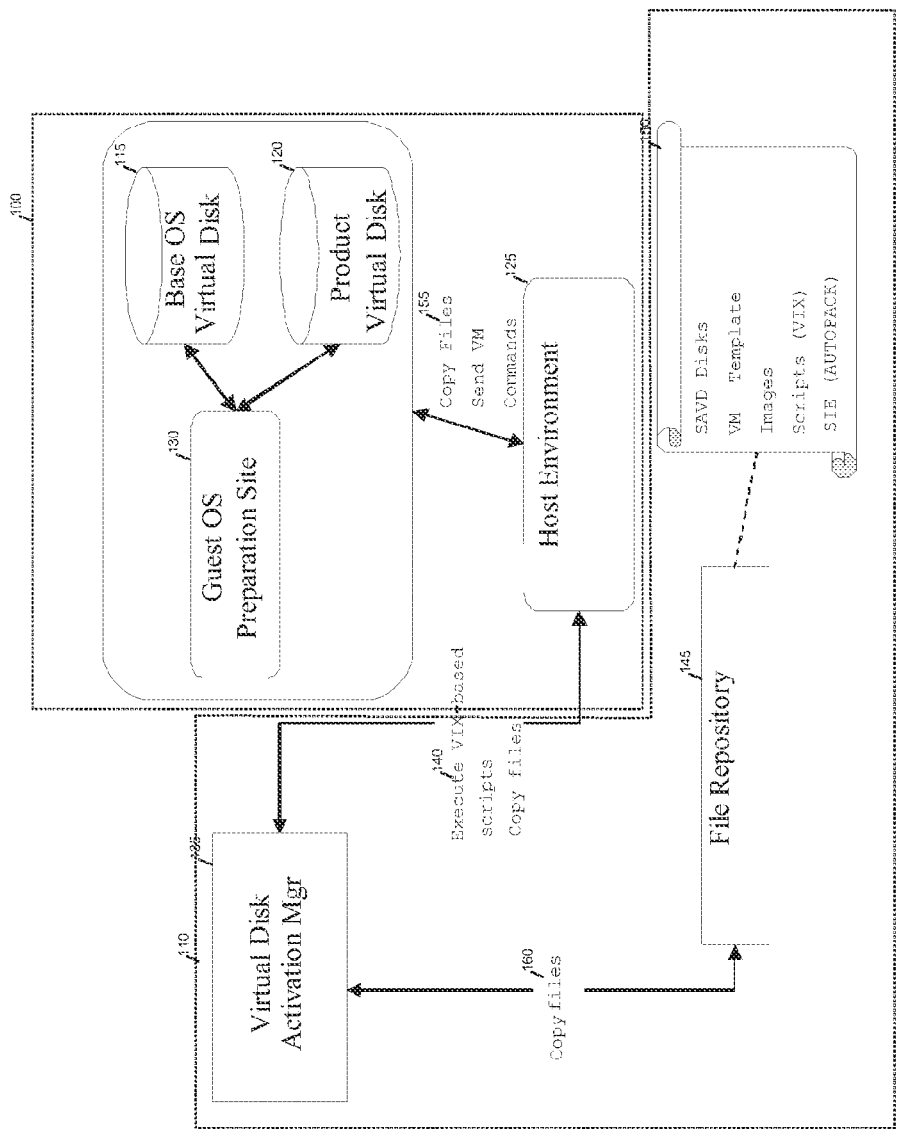
FIG. 1 illustrates a system environment to set-up a preparation site and to create a virtual appliance according to aspects of the invention.

FIG. 1 illustrates a system environment to set up a preparation site and to create a virtual appliance according to aspects of the invention. To create an image of the virtual appliance, a software application manufacturer may have a virtual management server 110 to manage a virtual machine environment. The software application manufacturer may also have a preparation site server 100 on which virtual machines can be installed. For instance, a host environment 125, which is a virtual machine monitor, can be a VMware virtual machine monitor to manage virtual machines. A host environment 125 can also include a guest operating system preparation site 130 with virtual disks, such as a base operating system virtual disk 115 and a product virtual disk 120 (as illustrated).

A new software component is installed on the virtual management server 110 that is referred to herein as a virtual disk activation manager (VDAM) 135. The virtual disk activation manager 135 is provided to create, in a file repository 145, all the necessary files 150 to create a final image of the virtual appliance that will be distributed to the customer. These files comprise a virtual machine image that will be used to create a base operating system virtual disk of the virtual appliance. Particularly, the files will be used to create a self-activating virtual disk (SAVD) containing the application. For the first creation, the virtual image will contain a virtual disk for the virtual machine base operating system and a SAVD for the application. For upgrading of the application, only one SAVD will be created.

The virtual disk activation manager more particularly creates the virtual disk of the virtual appliance, which will include the software application libraries and the product disk. The product disk, according to aspects of the invention, is a self-activating virtual disk. The virtual disk activation manager communicates with the Host environment using an existing application programming interface (API). More particularly, the virtual disk activation manager may use a set of scripts to interact with the VMware virtual machine monitor leveraging a VIX interface provided by the VMware server to send commands both to the VMware virtual machine monitor and the VMware virtual machine. The VIX API automates the VMware virtual machine operations and runs programs or manipulates files within guest operating systems. The VIX interface is a programming interface for automating both virtual machine operations (such as stop VM, start VM, take VM snapshots . . . ) and guest operations (such as running an application inside the guest operating system, copying tiles between guest and host . . . ). Similar APIs could be used in different virtualization environments, besides VMware. The virtual disk activation manager component particularly can detect any change in the virtual machine related to the disk processing (add/replace/remove) and invoke the proper configurations in order to make the virtual appliance disk connected or disconnected to the virtual machine.

An existing software package tool such as the AUTOPACK function of the IBM Tivoli Provisioning Manager (IBM and Tivoli are trademarks of IBM Corporation), and a Software Package Installer Engine (SIE) are used in the preparation site to create the SAVD product disk. A software package includes operations that are necessary to install a software application on a system. The software package installer, by reading the software package, is able to prepare the target operating system for installation of the software application. The SIE program depends on the architecture of the target virtual machine.

Figure 2:
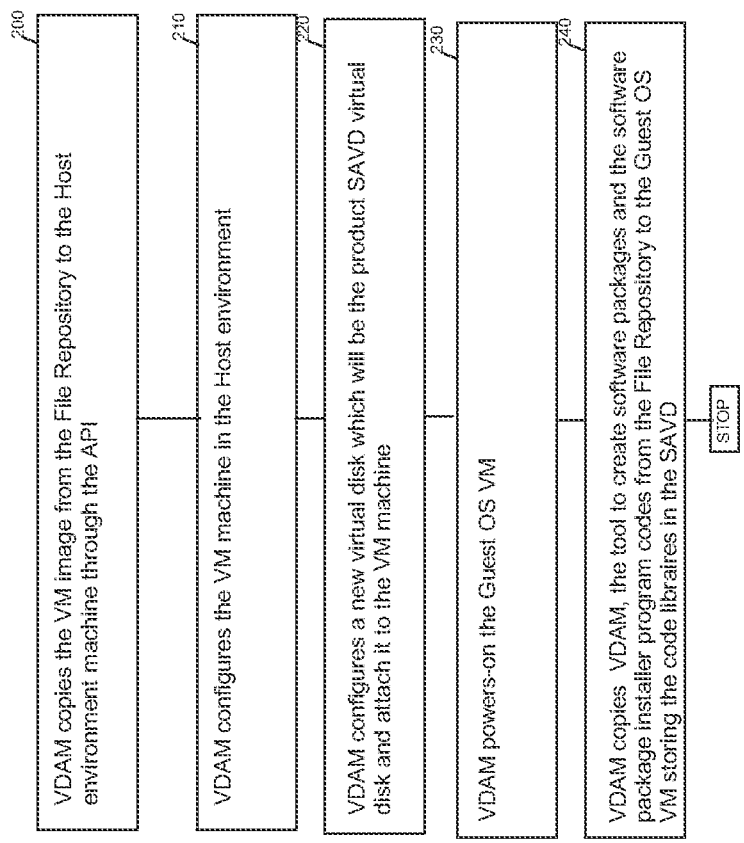
FIG. 2 is a flowchart of a method to set-up a site to prepare a virtual appliance according to aspects of the invention.
Figure 3:
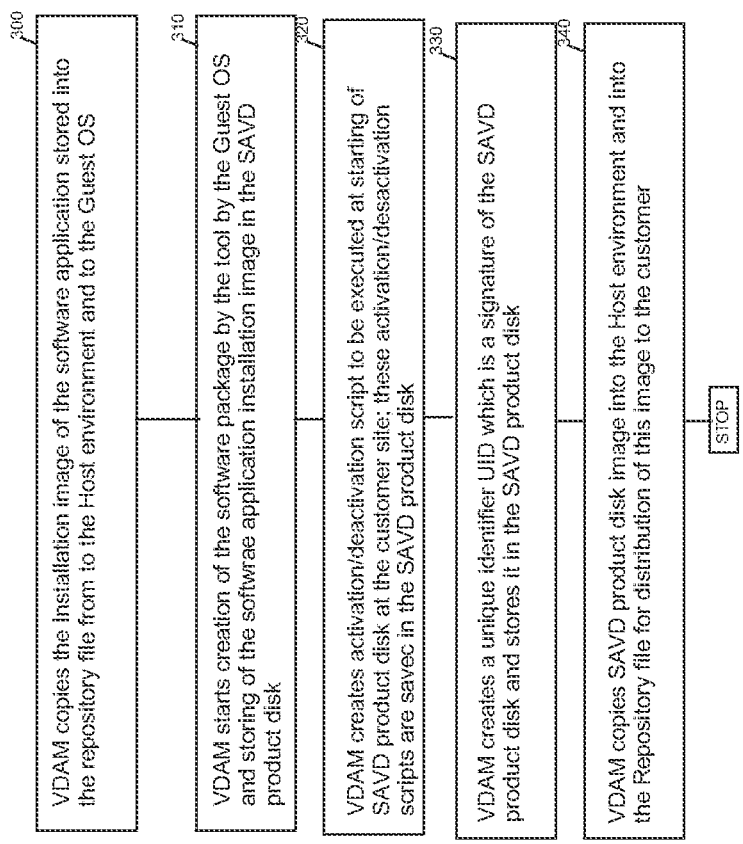
FIG. 3 is a flowchart of a method to create a virtual appliance in a preparation site as set-up according to the method described in the flowchart of FIG. 2.

The different exchanges of information between the components 140, 155, 160 are explained hereunder in relation with the method for setting-up the preparation and creating the virtual appliance, as respectively described in relation with description of FIG. 2 and FIG. 3 in the rest of the document.

FIG. 2 is a flowchart of a method to set-up the site to prepare a virtual appliance according to aspects of the invention. The software manufacturer sets up the preparation site, which preferably comprises a virtual management server and a preparation server comprising a virtual machine monitor which is the host environment. The method aims at making the preparation site ready for creation of the SAVD corresponding to a product disk of the virtual appliance. All the steps for setting up the preparation site are executed by the virtual disk activation manager program which is installed on the virtual management server and which executes scripts communicating with the host environment of the preparation server. For instance, the virtual disk activation manager communicates with the host environment using VIX scripts if the host environment is a VMware virtual machine monitor. Note that as all the steps are executed through scripts, this method can be entirely automated.

The method consists in installing a virtual machine for the required guest operating system at 200. Preferably, the virtual machine image is created from the file repository on the host environment machine which is a virtual machine manager (for instance, the VMware virtual machine monitor).

The virtual machine then needs to be configured in the virtual machine manager using its API at 210. This configuration consists in registering the new virtual machine, referring to the just copied image. The result is the creation of the base operating system virtual disk.

Next, still executed on the host environment, a new virtual disk is configured at 220, from which an image has to be created. This new virtual disk is attached to the virtual machine image. This disk will become the SAVD product disk at the end the process.

The guest operating system virtual machine is then powered-on at 230 and the program codes of: a tool for creating software packages (such as AUTOPACK), the corresponding software package installer (SIE), and a virtual disk activation manager, are copied at 240 on the guest operating system. The libraries are copied into the SAVD, still through a VIX-based script in the case of VMware. In fact, only the installer (SIE)

will be necessary at the customer site and for simplification, the software package tool (such as AUTOPACK) may be not stored on the final SAVD to be distributed to the customer.

FIG. 3 is the flowchart of a method to create the virtual appliance according to aspects of the invention in the preparation site as set-up according to the method described in the flowchart of FIG. 2. Once the guest operating system is ready in the preparation site, a SADV product disk can be created. Note that this SAVD product disk can be the product disk of the first virtual appliance distributed to the customer, or the product disk comprising an upgrade of the software application. This SAVD disk is the only virtual disk distributed to the user to upgrade a corresponding software application as there is no value in providing a SAVD and an operating system virtual disk in the virtual appliance for upgrading the application. The virtual appliance of the first distribution of the application may contain an operating system virtual disk, but the creation of the operating system disk is not part of the invention. This is why the method focuses on the creation of a SAVD as the only virtual disk in the virtual appliance.

All the steps to create a SAVD product disk are automatically performed by the virtual disk activation manager component interfacing the with the host environment virtual machine monitor using API-based scripts (VIX for VMware environment).

The installation image of the software application, including the product binaries, is copied 300 from the repository file to the host environment and from the host environment to the guest operating system.

A software package for the software application to be distributed is first created 310 in the guest operating system virtual machine by the tool to create software packages. For instance, the AUTOPACK tool automates the creation of software packages using a differencing technology by comparing two successive system snapshots of the preparation machine system before and after the software application installation. By this way, AUTOPACK detects file and system changes made by the installation of an application and creates the operations to be executed to adapt the target system to the software application. The installer (SIE) is then able to execute these operations automatically, install the software application libraries for their execution on a target system.

The virtual disk activation manager, through API-based script performs a first AUTOPACK snapshot of the system in the guest operating system virtual machine. AUTOPACK just captures the changes occurring to the system related files and registry entries on the operating system base virtual disk. Then, the software application is installed referring to the software application installation images directories in the SAVD product disk. The installation is performed in silent mode if silent mode is supported by the guest operating system and this application. The installation is alternatively performed in an operator assisted mode. A second AUTOPACK snapshot is run in the guest operating system virtual machine. AUTOPACK differencing is run, and the software package is built in the guest operating system virtual machine. The software package created by AUTOPACK is then stored into the SAVD product disk 120 created at 220 during setting-up of site preparation.

It is noted that in using some existing tools to create software packages, some software packages may contain not only the instructions to be executed to create/modify system files but also may contain the binaries libraries of the application. This is just an option of implementation. In the case described in the illustrated embodiment, the software package and the application binaries libraries are separated and are stored at 300, 310 on the SAVD product disk.

The virtual disk activation manager creates specific activation/de-activation API-based scripts at 320 to be used by the virtual disk activation manager at installation of the software application on a user target system. A software application, once installed, may need to have specific host name used etc. As an example some applications need to be reconfigured in the case where the IP address of the machine where it is installed has changed. A specific reconfiguration command has to be executed for this purpose. The created activation/de-activation API-based scripts are copied into the SAVD product disk.

A unique identifier, e.g., universally unique identifier (UUID) identifying the SAVD product disk is created at 330 and is stored in the SAVD product disk. The unique identifier is a kind of signature of the SAVD product disk. The unique identifier can be calculated for example, composing different attributes of the SAVD such as using the SAVD name, size, its version, the virtual appliance name and so on. Several algorithms already exist in the field for the calculation of a UUID. The unique identifier is used during the phase of activation of the SAVD product disk at the customer site when the customer installs for the first time, or upgrades, the software application.

The guest operating system is powered-off and the SAVD product disk is detached. The SAVD product disk image is copied at 340 from the host environment to the file repository. The SAVD product disk includes, software application installation images (which includes the software application binaries), the software package, the activation/de-activation scripts, which are executed by the virtual disk activation manager when an activation/de-activation event occurs, the virtual disk activation manager, SIE and AUTOPACK libraries. The just created SAVD product disk can be part of the initial delivery of the virtual appliance image 150 or the SAVD product disk can be created when a new version of the product is distributed to the customers.

Figure 4:
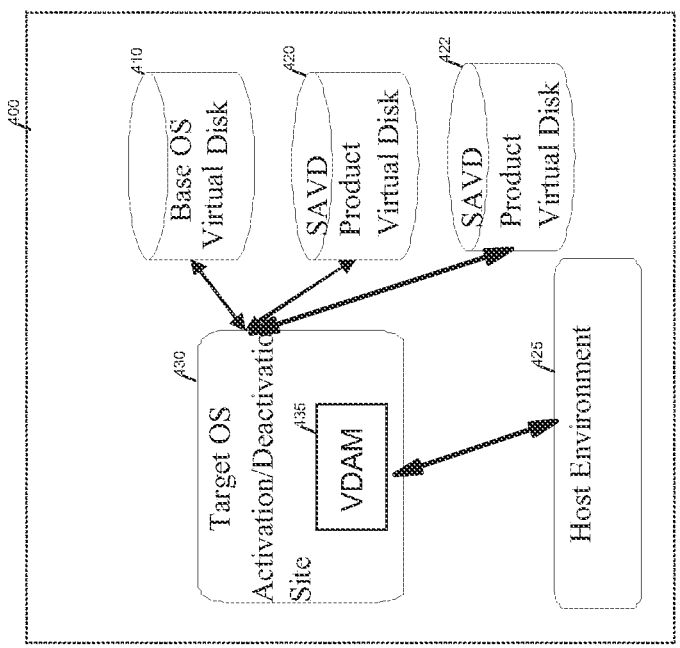
FIG. 4 illustrates a system environment for installing or un-installing a virtual appliance created according to the method described in the flowchart of FIG. 3.

FIG. 4 illustrates a system environment, according to aspects of the invention, for installing or un-installing the virtual appliance created as described according to the flowchart of FIG. 3. The customer system environment 400 for installing and upgrading the software application may comprise a server on which a virtual machine monitor such as a VMware virtual machine monitor, and the host environment 425 manage virtual machine.

At first installation of the software application, a virtual machine image that may have been provided in the virtual appliance of the first installation is installed by the customer as a target operating system 430 with its base operating system virtual disk 410. In the case where the application virtual appliance, even for the first version, contains only a SAVD, the customer has installed the customer's own virtual machine and has ordered a SAVD for the operating system of the corresponding virtual machine. The customer has now to install a SAVD product disk 420, which is a self-activating virtual disk used to install the software application on the target operating system virtual machine.

For activating/deactivating SAVDs, the virtual disk activation manager and SIE 435 are both started on the target operating system. The virtual disk activation manager uses the SIE as a tool to perform installation. The virtual disk activation manager is preferably started as a service, as a daemon component, to continuously monitor the system for events related to addition or removal of disks.

It is noted that the virtual disk activation manager needs to be installed once on the customer virtual machine to execute scripts of commands to the virtual machine monitor. Once installed, the virtual disk activation manager will be reused for the install, update and remove of the next SAVDs. Optionally the customer may execute a set-up of the virtual disk activation manager program. The set-up program can be stored on the SAVD and can be performed at attachment of the virtual disk using an existing tool in the operating system of the virtual machine (such as AUTORUN with Windows).

Figure 5:
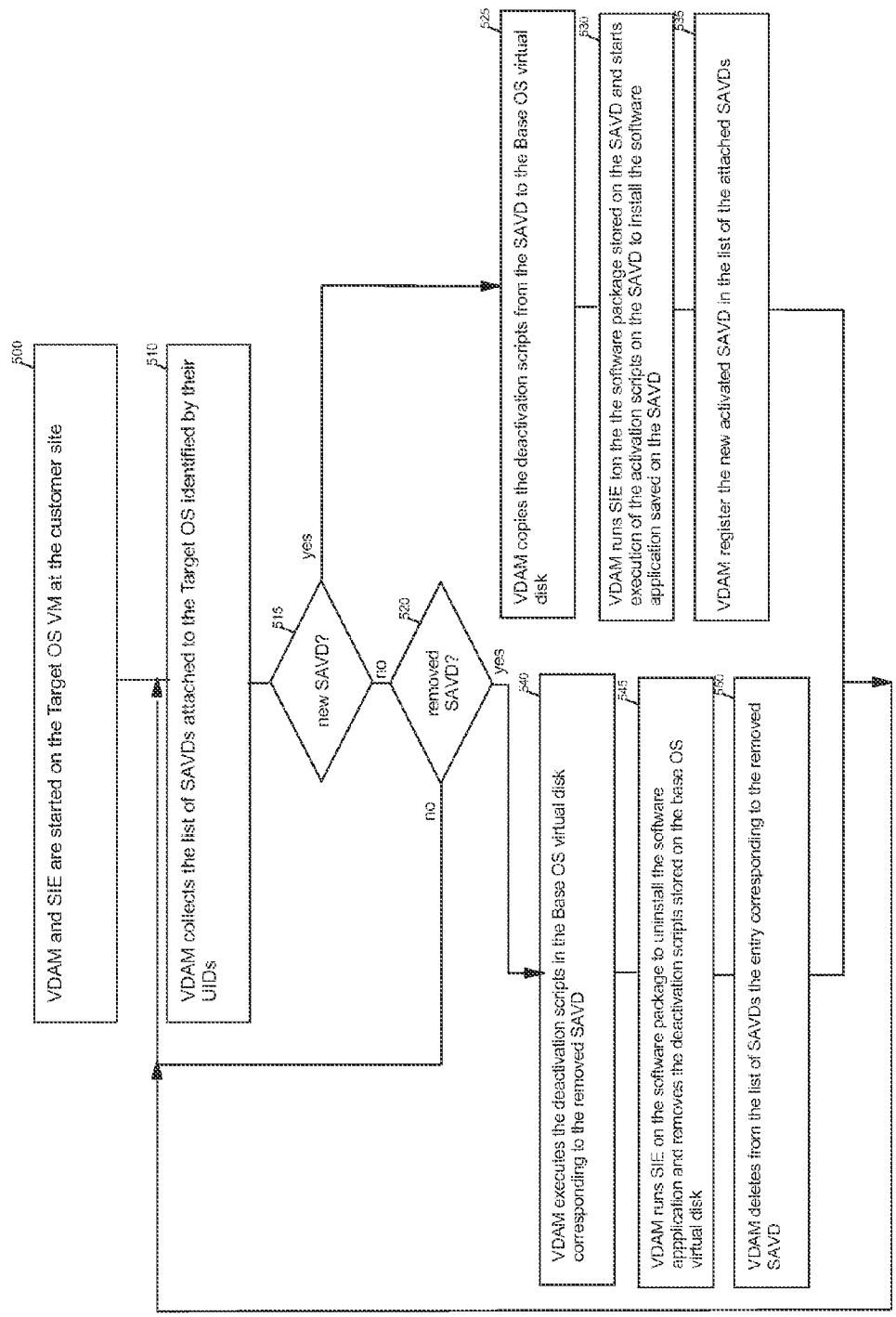
FIG. 5 is a flowchart of a method according to aspects of the invention, for installing or un-installing virtual appliance self-activating virtual disk (SAVD) created according to the flowchart of FIG. 3.

FIG. 5 is the flowchart of the method according to the preferred embodiment of the invention for installing or un-installing the virtual appliance SAVDs created as described according to the method described in the flowchart of FIG. 3.

Assuming a SAVD product disk is attached to the target operating system, the virtual disk activation manager collects at 510 the list of all the SAVDs attached to the virtual machine by reading the UIDs. It compares the current list with the list stored locally in the base operating system and corresponding to the last starting of the virtual disk activation manager service. At creation of the target operating system the list is empty and when the virtual appliance is installed for the first time one SAVD is identified.

If the virtual disk activation manager has detected a new SAVD (answer yes to test 515), the virtual disk activation manager copies the deactivation script at 525 in the SAVD to the base operating system virtual disk. Then, the virtual disk activation manager starts installation of the software package in the SAVD by the SIE and the activation scripts to install the software application at 530. The virtual disk activation manager updates at 535, the local list of active SAVDs in the base operating system disk adding the entry of the new SAVD. If necessary, the target operating system is rebooted if required by the installation of the software package or by the activation scripts.

If the virtual disk activation manager has detected that a SAVD is removed (answer yes to test 520), the related deactivation script copied in the base operating system virtual disk from the SAVD at its activation is executed at 540. The virtual disk activation manager runs the SIE to undo the installation of the software package corresponding to the SAVD to be removed. The de-activation script of this SAVD is removed at 545 from the base operating system virtual disk. The virtual disk activation manager deletes at 550, the entry of the SAVD to be removed in the list of SAVDs. If necessary, the target operating system is rebooted if required by the un-installation of the software package or by the deactivation scripts.

To work as a service, the virtual disk activation manager may start a loop (answer no to test 520) to collect and process virtual system events related to the addition/removal of virtual disks in the target operating system. If an event for a new SAVD is received, the virtual disk activation manager performs the steps for activating the new SAVD. If an event for a removed SAVD is received, the virtual disk activation manager performs the steps for de-activating the removed SAVD. Because of the loop on the virtual disk activation manager started as a daemon to detect system events, a loop is performed at 510 after execution of the installation or removal of the virtual disk at 535, 550.

According to aspects of the invention, distribution of virtual appliances on different virtual disks is implemented by methods and systems that allow the software manufacturer to build a SAVD that comprises software application binaries (the product disk), this SAVD product disk being automatically installed by the user or replaced on the user's site virtual machine so as to avoid performing manual operations.

One aspect for the software manufacturer distributing the applications with SAVDs is that the creation of a SAVD product disk by the software manufacturer in the software manufacturer's preparation site can also be automated as described in relation with the description of FIG. 3. This method may allow the software manufacturer to avoid distributing an operating system in the virtual appliance. The virtual appliance may only comprise one SAVD as virtual disk containing the application binaries and all the artifacts necessary to an auto installation or replacement of the application in the virtual machine environment of the customer. When upgrading the application by replacing the SAVD product disk, the customer will not change the virtual machine operating system virtual disk on which the customer may have included additional data and configurations that could get lost if the operating system disk had been distributed with the application upgrade virtual appliance. Furthermore, the overall size of the artifacts required to install the appliance is reduced since all the operating system related files are not included.

One additional aspect is that the operating system is not distributed with a new version of the application. Thus, the manufacturer avoids issues related to the licensing agreement required when the operating system needs to be re-distributed along with a new version of the virtual appliance. In fact, usually the operating system comes with a proprietary license that prevents a free redistribution of the image.

According to aspects of the invention, the software manufacturer may choose to distribute an operating system virtual disk and a SAVD product disk in the first version of the application virtual appliance, and to distribute an SAVD product disk only for each new version the application. The manufacturer could also distribute an operating system disk with a SAVD containing an application upgrade. However, the distribution of an operating system disk with a SAVD containing an application upgrade may not be necessary as one aspect of the invention will be lost, which is that the customer avoids modifying the customer's operating system base system when replacing the SAVD to upgrade the application binaries on the customer's site.

Aspects set out more fully herein, rely on a particular sequencing and usage of APIs and commands that the specific virtualization vendor provides to implement such product installation/upgrade. As an alternative to the silent and full automatic approach, a user interface is provided that guides and assists the administrator in the reconfiguration process.

Aspects also rely upon the use of 'software packages' to deliver software application libraries, which include automatic operations to be executed on the target machine when installing the software application.

The virtual machine of the customer uses a new program (the virtual disk activation manager) which, using a SAVD product disk unique identifier is able to detect and install/uninstall a new or removed SAVD product disk and to start the automatic installation or replacement of the corresponding software on the target virtual machine.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A computer usable hardware with executable program code to automatically upgrade a software application distributed as a virtual appliance in a virtual machine system stored thereon, the program code instructing a processor to perform:

comparing, by an application programming interface of a virtual machine monitor, a list of self-activating virtual disks attached to a target operating system of the virtual machine system with a list of installed virtual appliance disks stored in a base operating system virtual disk to detect a new self-activating virtual disk attached to the target operating system; and performing, if a new self-activating virtual disk is detected:
storing deactivation scripts from the new self-activating virtual disk to the base operating system virtual disk, without overwriting a current base operating system virtual disk on the virtual machine system; and
executing an installation script from the new self-activating virtual disk by performing:
modifying the target operating system according to instructions stored on the new self-activating virtual disk by starting execution of an installing/un-installing program stored on the new self-activating virtual disk which installs the software application stored on the new self-activating virtual disk; and
adding an entry for the new self-activating virtual disk in the list of installed virtual appliance disks stored in the base operating system virtual disk.

2. The computer usable hardware of claim 1, further comprising:
executable program code for executing specific additional activation operations if the specific additional activation operations are stored on the new self-activating virtual disk, to reconfigure the software application.

3. The computer usable hardware of claim 1, further comprising:
executable program code for executing an un-installation script having been already stored in the operating system if a removal of a self-activating virtual disk is detected, wherein the self-activating virtual disk is removed by performing:
modifying the operating system according to instructions stored on the self-activating virtual disk to be removed which starts execution of an installing/un-installing program stored on the self-activating virtual disk to be removed and which un-installs the software application; and
deleting the entry of the self-activating virtual disk to be removed in the list of the self-activating virtual disks currently attached.

4. The computer usable hardware of claim 3, further comprising:
executable program code for executing, if stored on the self-activating virtual disk to be removed, specific additional operations on the system allowing that the application be un-installed.

5. The computer usable hardware of claim 1, further comprising:
executable program code for continuously monitoring the virtual machine for self-activating virtual disk attachment or self-activating virtual disk removal events on the virtual machine.

6. The computer usable hardware of claim 1, further comprising:
executable program code for:
storing a software application package on an initialized new self-activating virtual disk;
storing on the new self-activating virtual disk, an installing/un-installing program that installs/un-installs the software application;
creating, using a program package tool, instructions, forming a program package, for modifying the base operating system to install/un-install the software application that will be executed by the installing/un-installing program; and
creating a disk identifier identifying the self-activating virtual disk as a self-activating virtual disk, and storing the disk identifier on the new self-activating virtual disk.

7. The computer usable hardware of claim 6, further comprising:
executable program code for creating and storing on the new self-activating virtual disk, specific additional operations to be executed on the system to allow the software application configuration after installation.

8. The computer usable hardware of claim 1, wherein the executable program code for comparing and performing are automatically executed by a virtual disk activation manager executing scripts comprising application program interface programming instructions interfacing the virtual machine monitor of the virtual machine.

9. The computer usable hardware of claim 8, further comprising:
executable program code for setting-up the virtual disk activation manager for automatic step execution.

10. The computer usable hardware of claim 1, wherein:
the executable program code for comparing a list of self-activating virtual disks comprises executable program code for:
comparing a list of unique identifiers which are each a specific signature of a self-activating virtual disk with the list of unique identifiers installed virtual appliance disks; and
creating a unique identifier consists in calculating a specific signature based on the attributes of the self-activating virtual disks.

* * * * *